United States Patent
Davis

(10) Patent No.: US 10,472,247 B2
(45) Date of Patent: *Nov. 12, 2019

(54) ZEOLITE SSZ-52X

(71) Applicant: Chevron U.S.A. Inc., San Ramon, CA (US)

(72) Inventor: Tracy Margaret Davis, Novato, CA (US)

(73) Assignee: Chevron U.S.A. Inc., San Ramon, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/846,109

(22) Filed: Dec. 18, 2017

(65) Prior Publication Data
US 2019/0185331 A1 Jun. 20, 2019

(51) Int. Cl.
*C01B 39/02* (2006.01)
*B01J 29/80* (2006.01)
(Continued)

(52) U.S. Cl.
CPC .......... *C01B 39/48* (2013.01); *B01D 53/9418* (2013.01); *B01J 29/70* (2013.01);
(Continued)

(58) Field of Classification Search
CPC ..... C01B 39/023; C01B 39/026; C01B 39/48; B01J 29/70; B01J 29/80; B01J 2029/062; B01D 53/9418
See application file for complete search history.

(56) References Cited

U.S. PATENT DOCUMENTS

| 3,140,249 A | 7/1964 | Plank et al. |
| 3,140,251 A | 7/1964 | Plank et al. |

(Continued)

FOREIGN PATENT DOCUMENTS

| WO | 2016039825 A1 | 3/2016 |
| WO | 20180004876 A1 | 1/2018 |

OTHER PUBLICATIONS

Dan Xie, et al., "SSZ-52, a zeolite with an 18-layer aluminosilicate framework structure related to that of the DeNOx catalyst Cu-SSZ-13", J. Am. Chem. Soc. 2018, 135(28):10519-10524.
(Continued)

*Primary Examiner* — David M Brunsman
(74) *Attorney, Agent, or Firm* — E. Joseph Gess; Terrence M. Flaherty; Melissa M. Hayworth

(57) ABSTRACT

The present invention relates to new crystalline zeolite SSZ-52x prepared using a quaternary ammonium cation templating agent, for example, having the structure:

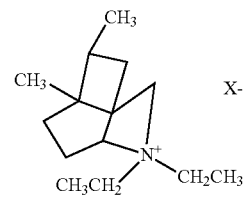

wherein $X^-$ is an anion which is not detrimental to the formation of the SSZ-52x. SSZ-52x is useful as a catalyst and shows improved durability, particularly with regard to $NO_x$ conversion.

14 Claims, 4 Drawing Sheets

(51) Int. Cl.
    *B01D 53/94*     (2006.01)
    *C01B 39/48*     (2006.01)
    *B01J 29/70*     (2006.01)
    *B01J 29/06*     (2006.01)

(52) U.S. Cl.
    CPC ............ *B01J 29/80* (2013.01); *C01B 39/023* (2013.01); *C01B 39/026* (2013.01); *B01D 2255/50* (2013.01); *B01J 2029/062* (2013.01)

(56) References Cited

U.S. PATENT DOCUMENTS

| | | | |
|---|---|---|---|
| 3,140,253 | A | 7/1964 | Plank et al. |
| 4,297,328 | A | 10/1981 | Ritscher et al. |
| 4,503,024 | A | 3/1985 | Bourgogne et al. |
| 4,910,006 | A | 3/1990 | Zones et al. |
| 5,316,753 | A | 5/1994 | Nakagawa |
| 6,254,849 | B1 | 7/2001 | Lee et al. |
| 6,379,531 | B2 | 4/2002 | Lee et al. |
| 10,150,676 | B2 * | 12/2018 | Davis ................ B01J 29/70 |
| 2015/0064088 | A1 | 3/2015 | Green et al. |
| 2016/0068403 | A1 | 3/2016 | Liu |
| 2018/0002183 | A1 | 1/2018 | Davis |
| 2018/0127283 | A1 | 5/2018 | Davis |

OTHER PUBLICATIONS

International Search Report issued in corresponding application PCT/2017/067140 dated Mar. 7, 2018.

* cited by examiner

ZEOLITE SSZ-52X

FIELD

The present invention relates to new crystalline zeolite SSZ-52x, a method for preparing SSZ-52x using a quaternary ammonium cation templating agent such as, for example, N,N-diethyl-5,8-dimethyl-2-azonium bicyclo[3.2.2]nonane, and processes employing SSZ-52x as a catalyst.

STATE OF THE ART

Because of their unique sieving characteristics, as well as their catalytic properties, crystalline molecular sieves and zeolites are especially useful in applications such as hydrocarbon conversion, gas drying and separation. Although many different crystalline molecular sieves have been disclosed, there is a continuing need for new zeolites with desirable properties for gas separation and drying, hydrocarbon and chemical conversions, and other applications. New zeolites may contain novel internal pore architectures, providing enhanced selectivities in these processes.

U.S. Pat. No. 6,254,849 describes zeolite SSZ-52, its composition preparation and useful applications. U.S. Pat. No. 6,379,531 describes processes using SSZ-52. For example, SSZ-52 is useful as an absorbent for gas separation, and as a catalyst for reduction of $NO_x$ in gas streams or for methanol-to-olefins conversion.

Novel zeolites which can provide improved results in important applications such as $NO_x$ reduction are always significant and welcome to the industry.

SUMMARY

The present invention is directed to a family of crystalline molecular sieves with unique properties, referred to herein as "zeolite SSZ-52x" or simply "SSZ-52x". Preferably, SSZ-52x is obtained in its aluminosilicate form. As used herein, the term "aluminosilicate" refers to a zeolite containing both alumina and silica.

In one embodiment, there is provided an aluminosilicate molecular sieve composition comprising at least one intergrown phase comprising a SFW framework type molecular sieve and an AFX framework type molecular sieve, wherein a ratio of the SFW framework type molecular sieve to the AFX framework type molecular sieve in the at least one intergrown phase is in a range of from 60:40 to 70:30, as determined by powder X-ray diffraction. The molecular sieve exhibits the XRD pattern, as synthesized, of FIG. 4(a).

In accordance with this invention, there is provided a zeolite having a mole ratio of about 6-50 of an oxide selected from silicon oxide, germanium oxide and mixtures thereof to an oxide selected from aluminum oxide, gallium oxide, iron oxide, and mixtures thereof and having, after calcination, the X-ray diffraction lines of Table III below and the XRD pattern, as-synthesized, of FIG. 4(a). In one embodiment, the zeolite exhibits a $NO_x$ conversion of 100% at 250° C. after aging at 750° C. for 80 hours at 10% humidity. In essence, SSZ-52x shows better 900° C. durability as compared to the standard SSZ-52 material.

The present invention further provides such a zeolite having a composition, as synthesized and in the anhydrous state, in terms of mole ratios as follows:

TABLE I

| | |
|---|---|
| $YO_2/W_2O_3$ | 6-50 |
| $M_{2/n}/YO_2$ | 0.1-0.5 |
| $Q/YO_2$ | 0.01-0.08 | wherein Y is silicon, germanium or a mixture thereof; W is aluminum, gallium, iron, or mixtures thereof; M is an alkali metal cation, alkaline earth metal cation or mixtures thereof, n is the valence of M (i.e., 1 or 2); and Q is a quaternary ammonium cation having the structure

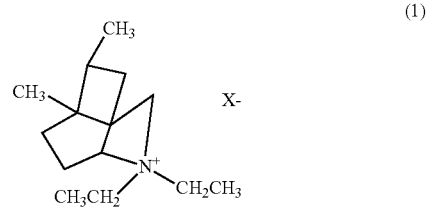

(1)

In one embodiment, the organic structure directing agent is selected from the group consisting of an N-ethyl-N-(2,4,4-trimethylcyclopentyl)pyrrolidinium cation, an N-ethyl-N-(3,3,5-trimethylcyclohexyl)pyrrolidinium cation, and mixtures thereof. The N-ethyl-N-(2,4,4-trimethylcyclopentyl)pyrrolidinium cation and the N-ethyl-N-(3,3,5-trimethylcyclohexyl)pyrrolidinium cation are represented by the following structures (2) and (3), respectively:

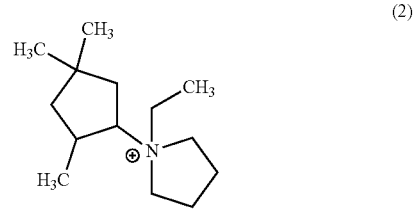

N-ethyl-N-(2,4,4-trimethylcyclopentyl)pyrrolidinium cation

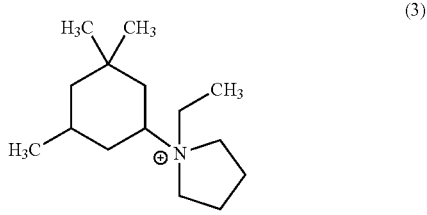

N-ethyl-N-(3,3,5-trimethylcyclohexyl)pyrrolidinium cation

The zeolite has, after calcination, the X-ray diffraction lines of Table III below.

In accordance with this invention, there is also provided a zeolite prepared by thermally treating a zeolite having a mole ratio of an oxide selected from silicon oxide, germanium oxide and mixtures thereof to an oxide selected from aluminum oxide, gallium oxide, iron oxide, and mixtures thereof of about 6-50 at a temperature of from about 200° C. to about 800° C. The present invention also includes this thus-prepared zeolite which is predominantly (at least 90%) in the hydrogen form, which hydrogen form is prepared by ion exchanging with an acid or with a solution of an ammonium salt followed by a second calcination.

Also provided in accordance with the present invention is a method of preparing a crystalline material comprising an oxide of a first tetravalent element and an oxide of a second tetravalent element which is different from said first tetravalent element, trivalent element, pentavalent element or mixture thereof, said method comprising contacting under crystallization conditions sources of said oxides and a templating agent comprising the structures (1), (2), or (3), and with the ratio of Q/YO$_2$ being in the range of from 0.01-0.05, in one embodiment 0.015-0.03, and the ratio of M$_{2/n}$/YO$_2$ being in the range of from 0.51-0.90, in one embodiment from 0.60-0.90, Q is one or a mixture of the templating agents, M is an alkaline metal cation, alkaline earth metal cation, or a mixture thereof, n is the valence of M, and Y is silicon, germanium or a mixture thereof.

Also provided is a process for converting a feedstock comprising an organic compound to a conversion product. The process comprises contacting the feedstock at organic compound conversion conditions with a catalyst comprising an active form of the present molecular sieve composition.

Also provided is an improved process for the reduction of oxides of nitrogen contained in a gas stream in the presence of oxygen wherein said process comprises contacting the gas stream with a zeolite, the improvement comprising using as the zeolite the zeolite of this invention. The zeolite may contain a metal or metal ions (such as cobalt, copper or mixtures thereof) capable of catalyzing the reduction of the oxides of nitrogen, and may be conducted in the presence of a stoichiometric excess of oxygen. In a preferred embodiment, the gas stream is the exhaust stream of an internal combustion engine. It has been found that SSZ-52x exhibits surprising stability in NO$_x$ reduction.

In another embodiment, there is provided a method for treating an exhaust gas. The method comprises contacting an exhaust gas stream comprising NO$_x$ and a reducing agent with a supported metal catalyst comprising: (1) one or more transition metals selected from the group consisting of Cr, Mn, Fe, Co, Ce, Ni, Cu, Zn, Ga, Mo, Ru, Rh, Pd, Ag, In, Sn, Re, Ir, Pt, and mixtures thereof, and (2) a support comprising the present molecular sieve composition, wherein the transition metal is present in an amount of 0.01 to about 6 wt. %, based on the total weight of the molecular sieve material. At least a portion of the NO$_x$ is then selectively reduced with the reducing agent to produce N$_2$ and H$_2$O.

Also provided in one embodiment is a process for converting lower alcohols and other oxygenated hydrocarbons comprising contacting said lower alcohol or other oxygenated hydrocarbon with a catalyst comprising the zeolite of this invention under conditions to produce liquid products.

Also provided in accordance with one embodiment is a process for the separation of gases, for example, nitrogen from a nitrogen-containing gas mixture, the process comprising contacting the mixture with a composition comprising the zeolite of this invention. In one embodiment, the gas mixture contains nitrogen and methane.

DETAILED DESCRIPTION

SSZ-52x is prepared from a reaction mixture having the composition shown in Table II below:

TABLE II

| Reaction Mixture | |
| --- | --- |
| YO$_2$/W$_2$O$_3$ | 15-60 |
| OH—/YO$_2$ | 0.30-1.0 |
| Q/YO$_2$ | 0.01-0.05, preferably 0.015-0.03 |
| M$_{2/n}$/YO$_2$ | 0.51-0.90, preferably 0.60-0.90 |
| H$_2$O/YO$_2$ | 15-50 | where Y, W, Q, M and n are as defined above. It is important to maintain the Q/YO$_2$ and M$_{2/n}$/YO$_2$ ratios within the noted ranges, otherwise SSZ-52x would not be obtained.

The novel SSZ-52x is an aluminosilicate molecular sieve comprising at least one intergrowth phase comprising a SFW framework type molecular sieve and an AFX framework type molecular sieve. The term intergrowth, or intergrowths, means that the molecular sieve is not a simple mixture of crystalline structures, but that the molecular sieve can have a crystalline structure with more than one type of framework. For example, a crystalline structure could have SSZ-52 as a main structure, yet have SSZ-16 as an intergrowth or contained as part of the overall crystalline structure. Zeolite SSZ-52 has been assigned the SFW framework type by the Structure Commission of the International Zeolite Association, while SSZ-16 has been assigned the AFX framework type.

For the present SSZ-52x, it has a combination of SFX framework type molecular sieve and AFX framework type molecular sieve, in a very distinct ratio. For SSZ-52x, the ratio of the SFW framework type molecular sieve to the AFX framework type molecular sieve in the at least one intergrowth phase is in a range of from 60:40 to 70:30, as determined by powder X-ray diffraction. In other words, SSZ-52x is a SFW-containing intergrowth material with the end-member SFW intergrowth ratio of 60-70% and the rest dominated by the end-member AFX (30-40% AFX). In stark contrast, SSZ-52 is a SFW-containing intergrowth material with the end-member SFW intergrowth ratio of 90% or above.

Figure 1:
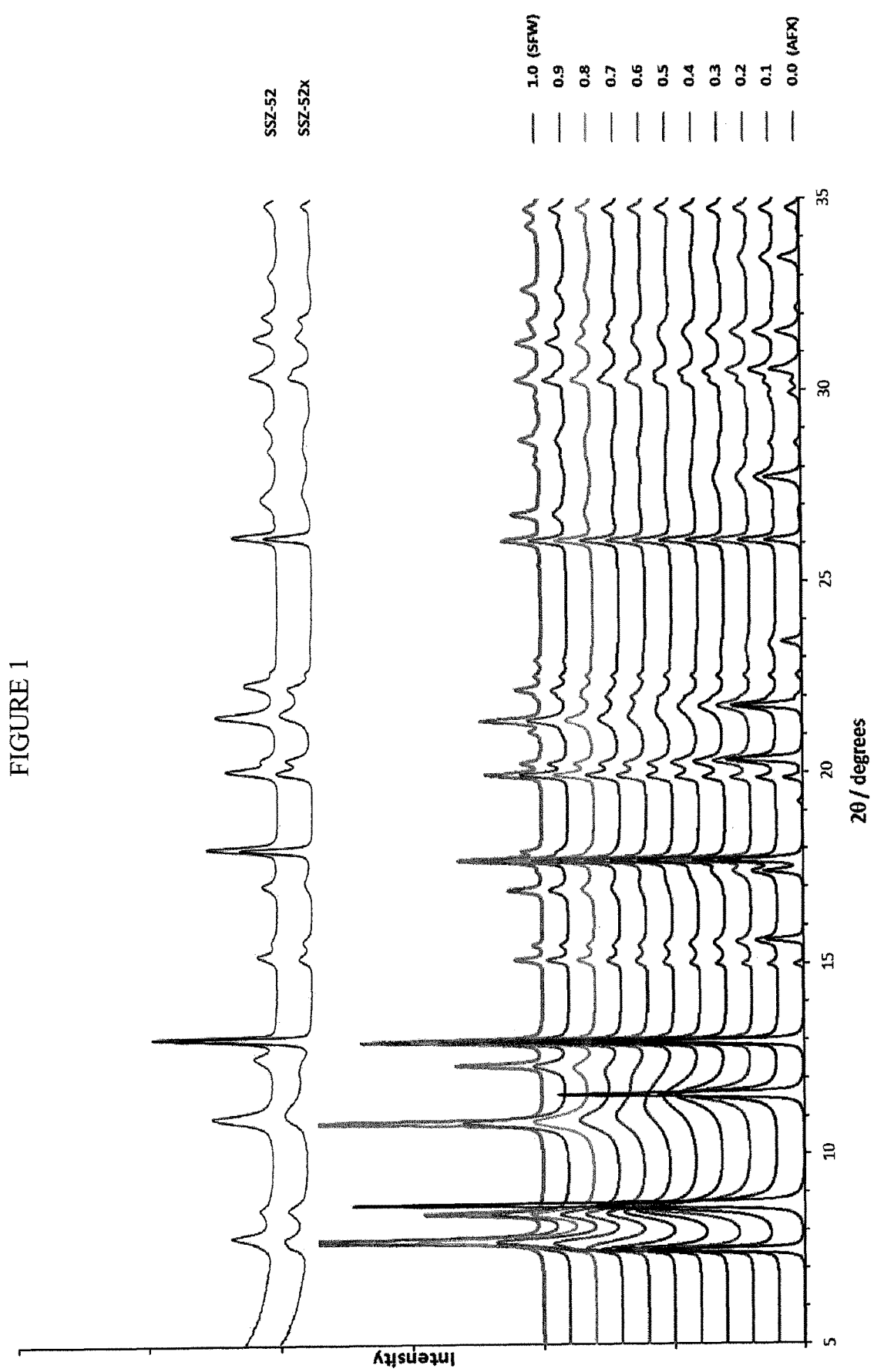
FIG. 1 shows the powder XRD patterns for SSZ-52, SSZ-52x and the simulated diffraction produced by DIFFaX for an intergrowth AFX/SFW material.

This significant difference between SSZ-52 and SSZ-52x can be seen in FIG. 1, which shows simulated XRD patterns for SSZ-52 and SSZ-52x generated by a program called DIFFaX. FIG. 1 also shows simulated XRD patterns for a 100% SFW framework type molecular sieve (1.0) to a 100% AFX framework type molecular sieve (0.0), and the expected XRD pattern for molecular sieves having varying combinations of SFW framework type molecular sieve and AFX framework molecular sieve.

DIFFaX is a simulation program available from the International Zeolite Association to simulate the XRD powder patterns for the intergrown phases of molecular sieves. This is based on the understanding that the structure of a molecular sieve can be either ordered or disordered. Molecular sieves having an ordered structure have periodic building units (PerBUs) that are periodically ordered in all three dimensions. Structurally disordered structures show periodic ordering in dimensions less than three (i.e., in two, one or zero dimensions). Disorder occurs when the PerBUs connect in different ways, or when two or more PerBUs intergrow within the same crystal. Crystal structures built from PerBUs are called end-member structures if periodic ordering is achieved in all three dimensions.

In disordered materials, planar stacking faults occur where the material contains ordering in two dimensions. Planar faults disrupt the channels formed by the material's pore system. Planar faults located near the surface limit diffusion pathways otherwise required in order to allow feedstock components to access the catalytically active portions of the pore system. Therefore, as the degree of faulting increases, the catalytic activity of the material typically decreases.

In the case of crystals with planar faults, interpretation of X-ray diffraction patterns requires an ability to simulate the effects of stacking disorder. DIFFaX is a computer program based on a mathematical model for calculating intensities from crystals containing planar faults. (See, M. M. J. Treacy et al., Proceedings of the Royal Chemical Society, London, A (1991), Vol. 433, pp. 499-520). DIFFaX is the simulation program selected by and available from the International Zeolite Association to simulate the XRD powder patterns for intergrown phases of molecular sieves. (See, "Collection of Simulated XRD Powder Patterns for Zeolites" by M. M. J. Treacy and J. B. Higgins, 2001, Fourth Edition, published on behalf of the Structure Commission of the International Zeolite Association). It has also been used to theoretically study intergrown phases of AEI, CHA and KFI molecular sieves, as reported by K. P. Lillerud et al. in "Studies in Surface Science and Catalysis", 1994, Vol. 84, pp. 543-550. DIFFaX is a well-known and established method to characterize disordered crystalline materials with planar faults such as intergrown molecular sieves.

FIG. 1 clearly shows the difference in framework between SSZ-52 and SSZ-52x in terms of the relative amounts of SFW framework and AFX framework.

In FIG. 1, the key 2-theta region to look at and to distinguish SSZ-52 and SSZ-52x is from 10.6-degree to 12.8-degree. "Traditional" SSZ-52 does not have a clear "platform or shoulder" between the peak at ~11-degree and the peak at ~12.4 degree, while SSZ-52x does show the platform or shoulder. This difference in the patterns and intergrowth phase leads to the advantageous benefits of SSZ-52x. As noted above, SSZ-52x is a SFW-containing intergrowth material with the end-member SFW intergrowth ratio of 60-70% and the rest dominated by the end-member AFX (30-40% AFX). In stark contrast, SSZ-52 is a SFW-containing intergrowth material with the end-member SFW intergrowth ratio of 90% or above.

In practice, SSZ-52x is prepared by a process comprising:

(a) preparing an aqueous solution containing sources of at least one oxide capable of forming a crystalline molecular sieve and a templating agent, or mixture of templating agents comprised of structures (1), (2), or (3). It has been found that the ratios of components in the reaction mixture must be within those noted in Table II above in order to obtain SSZ-52x.

(b) maintaining the aqueous solution under conditions sufficient to form crystals of SSZ-52x; and (c) recovering the crystals of SSZ-52x.

Accordingly, SSZ-52x may comprise the crystalline material and the templating agent in combination with metallic and non-metallic oxides bonded in tetrahedral coordination through shared oxygen atoms to form a cross-linked three dimensional crystal structure. The metallic and non-metallic oxides comprise one or a combination of oxides of a first tetravalent element(s), and one or a combination of a second tetravalent element(s) different from the first tetravalent element(s), trivalent element(s), pentavalent element(s) or mixture thereof. The first tetravalent element(s) is preferably selected from the group consisting of silicon, germanium and combinations thereof. More preferably, the first tetravalent element is silicon. The second tetravalent element (which is different from the first tetravalent element), trivalent element and pentavalent element is preferably selected from the group consisting of aluminum, gallium, iron, and combinations thereof. More preferably, the second trivalent or tetravalent element is aluminum.

Typical sources of aluminum oxide for the reaction mixture include aluminates, alumina, aluminum colloids, aluminum oxide coated on silica sol, hydrated alumina gels such as $Al(OH)_3$ and aluminum compounds such as $AlCl_3$ and $Al_2(SO_4)_3$. Typical sources of silicon oxide include silicates, silica hydrogel, silicic acid, fumed silica, colloidal silica, tetra-alkyl orthosilicates, and silica hydroxides. Gallium, germanium, and iron, can be added in forms corresponding to their aluminum and silicon counterparts.

A source zeolite reagent may provide a source of aluminum or boron. In most cases, the source zeolite also provides a source of silica. The source zeolite in its dealuminated or deboronated form may also be used as a source of silica, with additional silicon added using, for example, the conventional sources listed above. Use of a source zeolite reagent as a source of alumina for the present process is more completely described in U.S. Pat. No. 4,503,024 issued on Mar. 5, 1985 to Bourgogne et al. entitled "Process for the Preparation of Synthetic Zeolites, and Zeolites Obtained By Said Process", the disclosure of which is incorporated herein by reference.

Typically, an alkali metal hydroxide and/or an alkaline earth metal hydroxide, such as the hydroxide of sodium, potassium, lithium, cesium, rubidium, calcium, and magnesium, is used in the reaction mixture; however, this component can be omitted so long as the equivalent basicity is maintained. The templating agent may be used to provide hydroxide ion. Thus, it may be beneficial to ion exchange, for example, the halide for hydroxide ion, thereby reducing or eliminating the alkali metal hydroxide quantity required. The alkali metal cation or alkaline earth cation may be part of the as-synthesized crystalline oxide material, in order to balance valence electron charges therein.

The reaction mixture can also contain seeds of a molecular sieve material, such as SSZ-52, desirably in an amount of from 0.01 to 50,000 ppm by weight (e.g., from 100 to 5000 ppm by weight) of the reaction mixture.

One organic templating agent that can be used to prepare SSZ-52x comprises an N,N-diethyl-5,8-dimethyl-2-azonium bicyclo[3.2.2]nonane cation having the following structure (1):

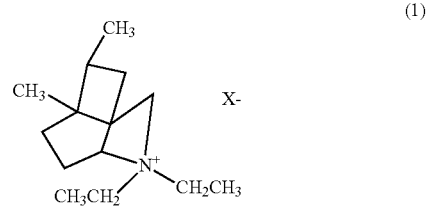

(1)

where X is an anion that is not detrimental to the formation of the SSZ-52x. Representative anions include halogen, e.g., fluoride, chloride, bromide and iodide, hydroxide, acetate, sulfate, tetrafluoroborate, carboxylate, and the like. Hydroxide is the most preferred anion.

In one embodiment, the organic structure directing agent is selected from the group consisting of an N-ethyl-N-(2,4,4-trimethylcyclopentyl)pyrrolidinium cation, an N-ethyl-N-(3,3,5-trimethylcyclohexyl)pyrrolidinium cation, and mixtures thereof. The N-ethyl-N-(2,4,4-trimethylcyclopentyl)pyrrolidinium cation and the N-ethyl-N-(3,3,5-trimethylcyclohexyl)pyrrolidinium cation are represented by the following structures (2) and (3), respectively:

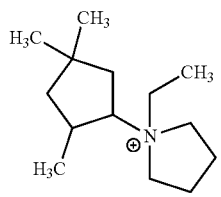

(2)

N-ethyl-N-(2,4,4-trimethylcyclopentyl)pyrrolidinium cation

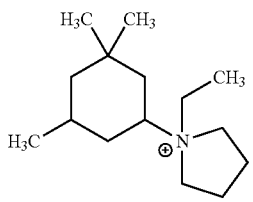

(3)

N-ethyl-N-(3,3,5-trimethylcyclohexyl)pyrrolidinium cation

Any one of the organic templating agents having structures (1), (2), and (3) can be used to prepare SSZ-52x, or a mixture of the templating agents can be used.

The reaction mixture is maintained at an elevated temperature until the crystals of the SSZ-52x zeolite are formed. The hydrothermal crystallization is usually conducted under autogenous pressure, at a temperature from 125° C. to 200° C., but more preferably between 120° C. and 160° C. The crystallization period is typically greater than 1 day and preferably from about 3 days to about 20 days.

Preferably, the zeolite is prepared using mild stirring or agitation.

During the hydrothermal crystallization step, the SSZ-52x crystals can be allowed to nucleate spontaneously from the reaction mixture. The use of SSZ-52 or SSZ-52x crystals as seed material can be advantageous in decreasing the time necessary for complete crystallization to occur. In addition, seeding can lead to an increased purity of the product obtained by promoting the nucleation and/or formation of SSZ-52x over any undesired phases. When used as seeds, SSZ-52 crystals are added in an amount between 0.1 and 10% of the weight of silica used in the reaction mixture.

Once the zeolite crystals have formed, the solid product is separated from the reaction mixture by standard mechanical separation techniques such as filtration. The crystals are water-washed and then dried, e.g., at 90° C. to 150° C. for from 8 to 24 hours, to obtain the as-synthesized SSZ-52x zeolite crystals. The drying step can be performed at atmospheric pressure or under vacuum.

SSZ-52x as prepared has a mole ratio of an oxide selected from silicon oxide, germanium oxide and mixtures thereof to an oxide selected from aluminum oxide, gallium oxide, iron oxide, and mixtures thereof of about 6-50; and has, after calcination, the X-ray diffraction lines of Table III below. SSZ-52x further has a composition, as synthesized and in the anhydrous state, in terms of mole ratios, shown in Table I below.

TABLE I

| As-Synthesized SSZ-52x | |
|---|---|
| $YO_2/W_2O_3$ | 6-50 |
| $M_{2/n}/YO_2$ | 0.1-0.5 |
| $Q/YO_2$ | 0.01-0.08 | where Y, W, Q, M and n are as defined above. It has also been found that the SSZ-52x prepared exhibits surprisingly improved stability and performance with regard to $NO_x$ conversion such that $NO_x$ conversion of 100% at 250° C. is achieved even after aging at 750° C. for 80 hours at 10% humidity. Such performance is an unexpected improvement over prior art zeolite SSZ-52, underscoring the difference between SSZ-52 and SSZ-52x. See, FIGS. 2 and 3.

After calcination, the SSZ-52x zeolites have a crystalline structure whose X-ray powder diffraction pattern includes the characteristic lines shown in Table III:

TABLE III

| Characteristic Peaks for Calcined SSZ-52x | | |
|---|---|---|
| 2-Theta(a) | d-Spacing, nm | Relative Intensity(b) |
| 7.68 | 1.150 | S |
| 8.46 | 1.044 | M |
| 10.96 | 0.806 | S |
| 12.30 | 0.719 | M |
| 12.96 | 0.683 | VS |
| 15.08 | 0.587 | W |
| 17.06 | 0.519 | W |
| 17.88 | 0.496 | VS |
| 19.94 | 0.445 | VS |
| 20.26 | 0.438 | VS |
| 21.46 | 0.414 | VS |
| 22.15 | 0.401 | M |
| 22.58 | 0.393 | W |

(a) ±0.20 degrees
(b) The powder XRD patterns provided are based on a relative intensity scale in which the strongest line in the X-ray pattern is assigned a value of 100: W = weak (>0 to ≤20); M = medium (>20 to ≤40); S = strong (>40 to ≤60); VS = very strong (> 60 to ≤100).

The X-ray patterns provided are based on a relative intensity scale in which the strongest line in the X-ray pattern is assigned a value of 100: W (weak) is less than 20; M (medium) is between 20 and 40; S (strong) is between 40 and 60; VS (very strong) is greater than 60.

Figure 4A:
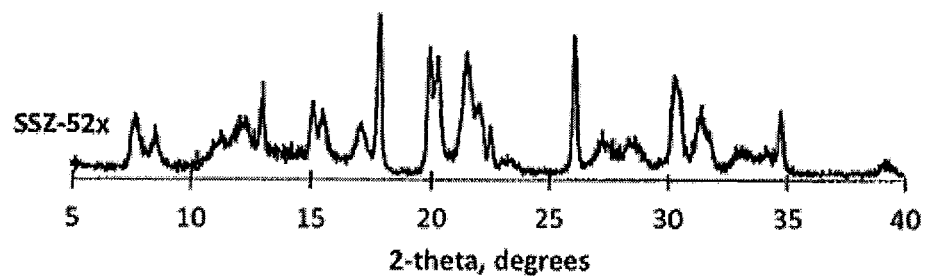
FIG. 4(a) shows the powder X-ray diffraction (XRD) pattern of as-synthesized SSZ-52x zeolite.
Figure 4B:
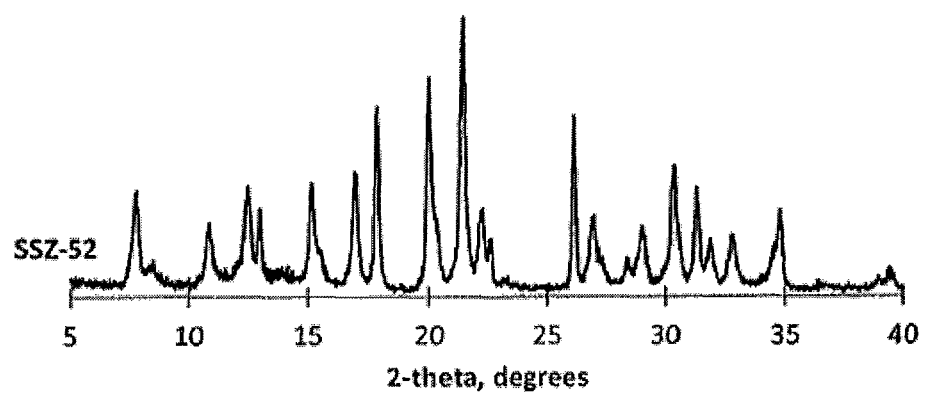
FIG. 4(b) shows the powder X-ray diffraction (XRD) pattern of as-synthesized SSZ-52 zeolite.

Characteristic X-ray diffraction lines for as-synthesized SSZ-52x are shown in Table IV below. FIG. 4(a) of the Drawing shows the XRD pattern for the as-synthesized form of SSZ-52x, as it compares to the XRD pattern for SSZ-52 shown in FIG. 4(b).

TABLE IV

| Characteristic Peaks for As-Synthesized SSZ-52x. | | |
|---|---|---|
| 2-Theta(a) | d-Spacing, nm | Relative Intensity(b) |
| 7.60 | 1.162 | S |
| 8.48 | 1.041 | W |
| 10.96 | 0.806 | W |
| 12.40 | 0.714 | S |
| 12.98 | 0.681 | M |

TABLE IV-continued

Characteristic Peaks for As-Synthesized SSZ-52x.

| 2-Theta(a) | d-Spacing, nm | Relative Intensity(b) |
|---|---|---|
| 15.12 | 0.585 | M |
| 17.00 | 0.521 | M |
| 17.86 | 0.496 | VS |
| 19.96 | 0.444 | VS |
| 20.28 | 0.438 | M |
| 21.52 | 0.413 | VS |
| 22.16 | 0.401 | M |
| 22.59 | 0.393 | W |

(a) ±0.20 degrees
(b) The powder XRD patterns provided are based on a relative intensity scale in which the strongest line in the X-ray pattern is assigned a value of 100: W = weak (>0 to ≤20); M = medium (>20 to ≤40); S = strong (>40 to ≤60); VS = very strong (> 60 to ≤100).

Representative peaks from the X-ray diffraction pattern of calcined SSZ-52x are shown in Table III. Calcination can result in changes in the intensities of the peaks as compared to patterns of the "as-made" material, as well as minor shifts in the diffraction pattern. The zeolite produced by exchanging the metal or other cations present in the zeolite with various other cations (such as $H^+$ or $NH_4^+$) yields essentially the same diffraction pattern, although again, there may be minor shifts in the interplanar spacing and variations in the relative intensities of the peaks. Notwithstanding these minor perturbations, the basic crystal lattice remains unchanged by these treatments.

Crystalline SSZ-52x can be used as-synthesized, but preferably will be thermally treated (calcined). Usually, it is desirable to remove the alkali metal cation by ion exchange and replace it with hydrogen, ammonium, or any desired metal ion. The zeolite can be leached with chelating agents, e.g., EDTA or dilute acid solutions, to increase the silica to alumina mole ratio. The zeolite can also be steamed; steaming helps stabilize the crystalline lattice to attack from acids.

Metals may also be introduced into the zeolite by replacing some of the cations in the zeolite with metal cations via standard ion exchange techniques (see, for example, U.S. Pat. No. 3,140,249 issued Jul. 7, 1964 to Plank et al.; U.S. Pat. No. 3,140,251 issued Jul. 7, 1964 to Plank et al.; and U.S. Pat. No. 3,140,253 issued Jul. 7, 1964 to Plank et al.). Typical replacing cations can include metal cations, e.g., rare earth, Group IA, Group IIA and Group VIII metals, as well as their mixtures. Of the replacing metallic cations, cations of metals such as rare earth, Mn, Ca, Mg, Zn, Cd, Pt, Pd, Ni, Cu, Co, Ti, Al, Sn, and Fe are particularly preferred.

The hydrogen, ammonium, and metal components can be ion-exchanged into the SSZ-52x. The zeolite can also be impregnated with the metals, or, the metals can be physically and intimately admixed with the zeolite using standard methods known to the art.

Typical ion-exchange techniques involve contacting the synthetic zeolite with a solution containing a salt of the desired replacing cation or cations. Although a wide variety of salts can be employed, chlorides and other halides, acetates, nitrates, and sulfates are particularly preferred. The zeolite is usually calcined prior to the ion-exchange procedure to remove the organic matter present in the channels and on the surface, since this results in a more effective ion exchange. Representative ion exchange techniques are disclosed in a wide variety of patents including U.S. Pat. No. 3,140,249 issued on Jul. 7, 1964 to Plank et al.; U.S. Pat. No. 3,140,251 issued on Jul. 7, 1964 to Plank et al.; and U.S. Pat. No. 3,140,253 issued on Jul. 7, 1964 to Plank et al.

Following contact with the salt solution of the desired replacing cation, the zeolite is typically washed with water and dried at temperatures ranging from 65° C. to about 200° C. After washing, the zeolite can be calcined in air or inert gas at temperatures ranging from about 200° C. to about 800° C. for periods of time ranging from 1 to 48 hours, or more, to produce a catalytically active product especially useful in hydrocarbon conversion processes.

Regardless of the cations present in the synthesized form of SSZ-52x, the spatial arrangement of the atoms which form the basic crystal lattice of the zeolite remains essentially unchanged.

SSZ-52x can be formed into a wide variety of physical shapes. Generally speaking, the zeolite can be in the form of a powder, a granule, or a molded product, such as extrudate having a particle size sufficient to pass through a 2-mesh (Tyler) screen and be retained on a 400-mesh (Tyler) screen. In cases where the catalyst is molded, such as by extrusion with an organic binder, the aluminosilicate can be extruded before drying, or, dried or partially dried and then extruded.

SSZ-52x can be composited with other materials resistant to the temperatures and other conditions employed in organic conversion processes. Such matrix materials include active and inactive materials and synthetic or naturally occurring zeolites as well as inorganic materials such as clays, silica and metal oxides. Examples of such materials and the manner in which they can be used are disclosed in U.S. Pat. No. 4,910,006, issued May 20, 1990 to Zones et al., and U.S. Pat. No. 5,316,753, issued May 31, 1994 to Nakagawa, both of which are incorporated by reference herein in their entirety.

$NO_x$ Reduction

SSZ-52x is quite favorably used for the catalytic reduction of the oxides of nitrogen in a gas stream. Typically, the gas stream also contains oxygen, often a stoichiometric excess thereof. Also, the SSZ-52x may contain a metal or metal ions within or on it which are capable of catalyzing the reduction of the nitrogen oxides. Examples of such metals or metal ions include copper, cobalt, iron, and mixtures thereof.

One example of such a process for the catalytic reduction of oxides of nitrogen in the presence of a zeolite is disclosed in U.S. Pat. No. 4,297,328, issued Oct. 27, 1981 to Ritscher et al., which is incorporated by reference herein. There, the catalytic process is the combustion of carbon monoxide and hydrocarbons and the catalytic reduction of the oxides of nitrogen contained in a gas stream, such as the exhaust gas from an internal combustion engine. The zeolite used is metal ion-exchanged, doped or loaded sufficiently so as to provide an effective amount of catalytic copper metal or copper ions within or on the zeolite. In addition, the process is conducted in an excess of oxidant, e.g., oxygen.

Figure 2:
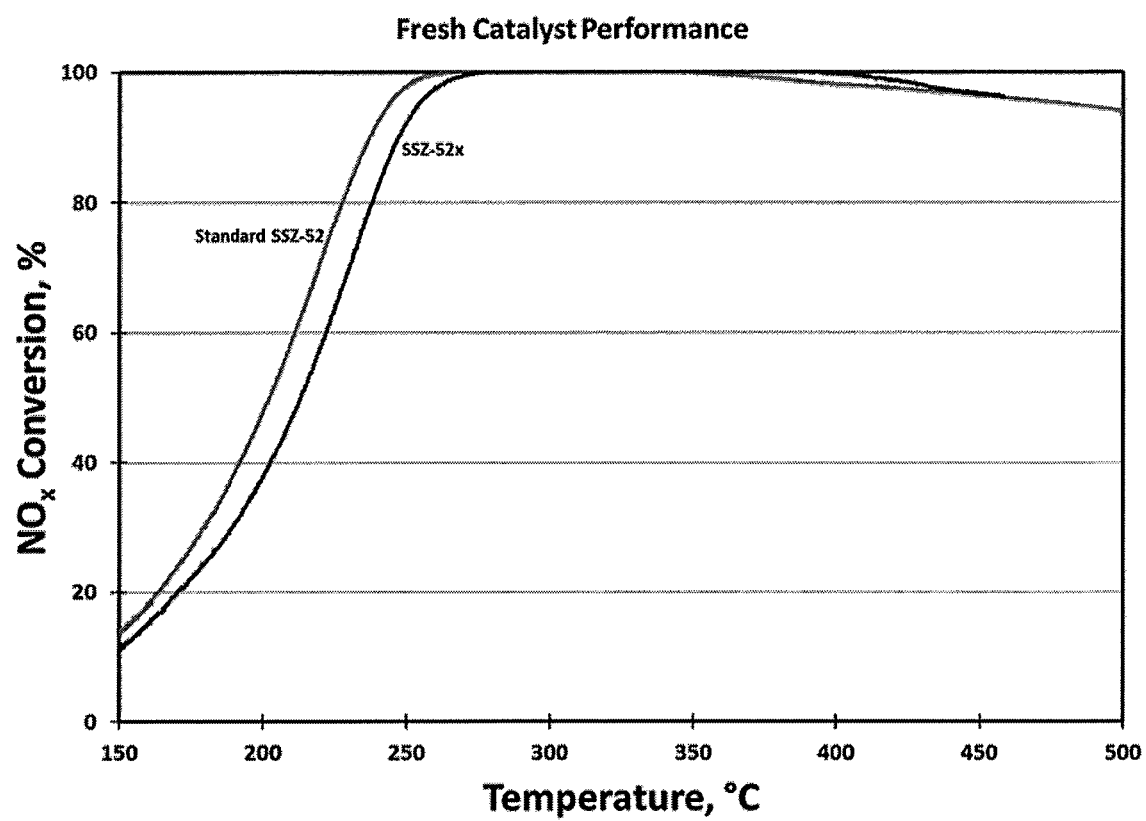
FIG. 2 plots NO$_x$ conversion based on temperature for fresh catalyst comprising SSZ-52 and SSZ-52x.
Figure 3:
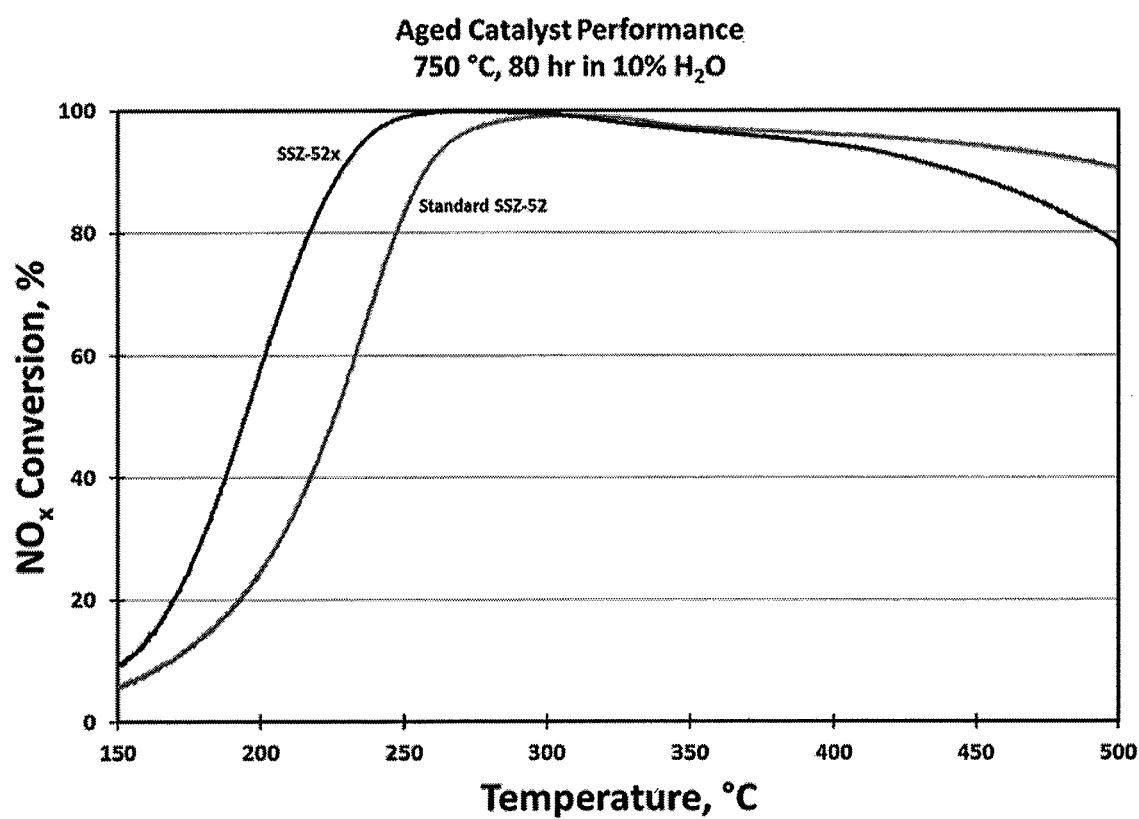
FIG. 3 plots NO$_x$ conversion based on temperature for SSZ-52 and SSZ-52x catalyst aged at 750° C. for 80 hr in 10% H$_2$O.

It has been found that the SSZ-52x provides enhanced performance with regard to $NO_x$ conversion compared to SSZ-52, for example. SSZ-52x is more stable as the aged catalyst has been observed to provide improved $NO_x$ conversion at a lower temperature, e.g., 100% at 250° C., as compared to SSZ-52. This is shown in FIGS. 2 and 3 of the Drawing.

Hydrocarbon Conversion Processes

SSZ-52x zeolites are useful in hydrocarbon conversion reactions. Hydrocarbon conversion reactions are chemical and catalytic processes in which carbon containing compounds are changed to different carbon containing compounds. Examples of hydrocarbon conversion reactions in which SSZ-52x are expected to be useful include hydrocracking, dewaxing, catalytic cracking and olefin formation reactions. The catalysts are also expected to be useful in other petroleum refining and hydrocarbon conversion reactions such as isomerizing n-paraffins and naphthenes, isomerizing olefins, polymerizing and oligomerizing olefinic or acetylenic compounds such as isobutylene and butene-1, reforming, forming higher molecular weight hydrocarbons from lower molecular weight hydrocarbons (e.g., methane upgrading) and oxidation reactions. The SSZ-52x catalysts may have high selectivity, and under hydrocarbon conversion conditions can provide a high percentage of desired products relative to total products.

SSZ-52x zeolites can be used in processing hydrocarbonaceous feedstocks. Hydrocarbonaceous feedstocks contain carbon compounds and can be from many different sources, such as virgin petroleum fractions, recycle petroleum fractions, shale oil, liquefied coal, tar sand oil, synthetic paraffins from NAO, recycled plastic feedstocks and, in general, can be any carbon containing feedstock susceptible to zeolitic catalytic reactions. Depending on the type of processing the hydrocarbonaceous feed is to undergo, the feed can contain metal or be free of metals, it can also have high or low nitrogen or sulfur impurities. It can be appreciated, however, that in general processing will be more efficient (and the catalyst more active) the lower the metal, nitrogen, and sulfur content of the feedstock.

The conversion of hydrocarbonaceous feeds can take place in any convenient mode, for example, in fluidized bed, moving bed, or fixed bed reactors depending on the types of process desired. The formulation of the catalyst particles will vary depending on the conversion process and method of operation.

Molecular sieve SSZ-52x may be suitable for use as a catalyst in the conversion of oxygenates to olefins. As used herein, the term "oxygenates" is defined to include, but is not necessarily limited to aliphatic alcohols, ethers, carbonyl compounds (e.g., aldehydes, ketones, carboxylic acids, carbonates, and the like), and also compounds containing hetero-atoms, such as, halides, mercaptans, sulfides, amines, and mixtures thereof. The aliphatic moiety will normally contain from 1 to 10 carbon atoms (e.g., from 1 to 4 carbon atoms). Particularly suitable oxygenate compounds are methanol, dimethyl ether, or mixtures thereof, especially methanol.

Conversion of oxygenates may be carried out with the oxygenate (e.g., methanol) in the liquid or the vapor phase, in batch or continuous mode. When carried out in continuous mode, a weight hourly space velocity (WHSV), based on oxygenate, of 1 to 1000 $h^{-1}$ (e.g., 1 to 100 $h^{-1}$) may be used. An elevated temperature is generally required to obtain economic conversion rates (e.g., a temperature between 300° C. and 600° C. or between 400° C. and 500° C.). The catalyst may be in a fixed bed, or a dynamic, e.g., fluidized or moving, bed.

The oxygenate feedstock may be mixed with a diluent, inert under the reaction conditions (e.g., argon, nitrogen, carbon dioxide, hydrogen, or steam). The concentration of oxygenate in the feedstream may vary widely (e.g., from 5 to 90 mole percent of the feedstock). The pressure may vary within a wide range (e.g., from atmospheric to 500 kPa).

The olefin(s) produced typically have from 2 to 30 carbon atoms (e.g., from 2 to 8 carbon atoms, from 2 to 6 carbon atoms, or from 2 to 4 carbons atoms, and most preferably are ethylene and/or propylene).

Other reactions which can be performed using the catalyst of this invention containing a metal, e.g., a Group VIII metal such platinum, include hydrogenation-dehydrogenation reactions, denitrogenation and desulfurization reactions.

The following Table V indicates typical reaction conditions which may be employed when using catalysts comprising SSZ-52x in the hydrocarbon conversion reactions of this invention. Preferred conditions are indicated in parentheses.

TABLE V

| Process | Temp., ° C. | Pressure | LHSV |
| --- | --- | --- | --- |
| Hydrocracking | 175-485 | 0.5-350 bar | 0.1-30 |
| Dewaxing | 200-475 (250-450) | 15-3000 psig (200-3000) | 0.1-20 (0.2-10) |
| Cat. Cracking | 127-885 | subatm.[1] (atm.–5 atm.) | 0.5-50 |
| Oligomerization | 232-649[2] 10-232[4] (27-204)[4] | 0.1-50 atm.[2,3] — — | 0.2-50[2] 0.05-20[5] (0.1-10)[5] |
| Condensation of alcohols | 260-538 | 0.5-1000 psig | 0.5-50[5] |
| Isomerization | 93-538 (204-315) | 50-1000 psig | 1-10 (1-4) |

[1]Several hundred atmospheres
[2]Gas phase reaction
[3]Hydrocarbon partial pressure
[4]Liquid phase reaction
[5]WHSV Other reaction conditions and parameters are provided below.

Catalytic Cracking

Hydrocarbon cracking stocks can be catalytically cracked in the absence of hydrogen using SSZ-52x, typically predominantly in the hydrogen form.

When SSZ-52x is used as a catalytic cracking catalyst in the absence of hydrogen, the catalyst may be employed in conjunction with traditional cracking catalysts, e.g., any aluminosilicate heretofore employed as a component in cracking catalysts. Typically, these are large pore, crystalline aluminosilicates. Examples of these traditional cracking catalysts are disclosed in the aforementioned U.S. Pat. Nos. 4,910,006 and 5,316,753. When a traditional cracking catalyst (TC) component is employed, the relative weight ratio of the TC to the SSZ-52x is generally between about 1:10 and about 500:1, desirably between about 1:10 and about 200:1, preferably between about 1:2 and about 50:1, and most preferably is between about 1:1 and about 20:1. The novel zeolite and/or the traditional cracking component may be further ion exchanged with rare earth ions to modify selectivity.

The cracking catalysts are typically employed with an inorganic oxide matrix component. See the aforementioned U.S. Pat. Nos. 4,910,006 and 5,316,753 for examples of such matrix components.

Other Uses for SSZ-52x

SSZ-52x can also be used as an adsorbent based on molecular sieve behavior.

SSZ-52x may also be used in the separation of gases, such as the separation of nitrogen from a nitrogen-containing gas mixture. One example of such separation is the separation of nitrogen from methane (e.g., the separation of nitrogen from natural gas).

EXAMPLES

The following examples demonstrate but are not intended to be limiting.

Example 1

Synthesis of N,N-diethyl-5,8-dimethyl-2-azonium bicyclo[3.2.2]nonane Cation (Templating Agent of Structure (1))

A three-neck, 5-liter flask is set up with additional funnel with equalization arm. A septum is place over the funnel.

Nitrogen is passed through the system. First an in-situ reagent is developed by placing 104.55 grams of diisopropylamine in 1859 ml of tetrahydrofuran (THF) and then slowly adding 401.7 ml of n-butyl lithium (2.5 M in hexane) while keeping the temperature near −70° C. The n-butyl lithium is charged to the addition funnel by use of a cannula. The addition into THF takes about 1.25 hours after which the resulting mixture is stirred for another hour. 104.53 grams of 3-methyl-2-cyclohexene-1 one in 1117 ml THF is added dropwise over a 0.75 hour period. Lastly, 161.73 grams of methyl acrylate is added over a period of 0.25 hour. Gradually, the reaction is allowed to warm to room temperature and its progress is followed by TLC. The reaction appears to go overnight.

Recovery of the product is begun by adding 1N HCl until the solution becomes acidic. The reaction product is transferred to separatory funnel and the aqueous phase is recovered to subsequently treat with methylene chloride (2.times.250 ml). The combined organic phase is dried over sodium sulfate and then strip solvent. The residue is taken up in ether to free it from a little gummy material. The ether is removed and the resulting oil is distilled; a Vigreaux column (30 cm) is set up and run at 2-4 mm Hg. The bulk of the product comes over between 123-137° C.

The resulting product is reduced using lithium aluminum hydride. The reduction produces a diol, 1-methyl-2-methanol-7-hydroxy bicyclo[2.2.2]octane. The side methanol group is tosylated by reaction of tosyl chloride (96.92 grams) with the diol (85.68 grams) in anhydrous pyridine (500 ml). The tosyl chloride is added to the other two components, under nitrogen, using a powder addition funnel while cooling the reaction to −5° C. The addition is carried out over 0.75 hour and the reaction mixture is warmed to room temperature and the reaction is allowed to run overnight. 500 ml of methylene chloride is added, the resulting mixture transferred to a separatory funnel, and washed with water (2.times.250 ml). The resulting product is dried over sodium sulfate, filtered, and stripped to yield 150 grams of oil.

The product is purified by column chromatography. A kilogram of silica gel (230-400 mesh) is slurried in hexane, and the oil is loaded on top in 50 ml methylene chloride. The elution is carried out using 25/75 ethyl acetate (ETOAC); hexane and fractions are monitored by TLC. Eighty-three grams of product is collected. The tosylate is then reduced using LAH (as above) to yield 1,2-dimethyl-7-hydroxy bicyclo[2.2.2]octane. Next, the alcohol is reoxidized to the ketone. 37.84 grams of the alcohol is reacted in a three-neck, 2-liter flask as follows: 34.60 grams of oxalyl chloride and 604 ml of methylene chloride are loaded in and blanketed under nitrogen. With an addition funnel with side arm, 46 grams of anhydrous dimethylsulfoxide (DMSO) in 122.7 ml of methylene chloride is added. The bath is cooled to −60° C. using a dry ice/acetone bath, and the addition takes 0.5 hour. The alcohol, in 53.4 ml methylene chloride, is added at this temperature over 0.5 hour followed by stirring for another 0.5 hour. 126.65 Grams of triethylamine is then placed in the addition funnel and addition begun and continued over 0.25 hour. All of the additions produce exothermic response, so cooling is continued. The reaction mixture is slowly warmed to room temperature and the reaction continued to run overnight.

Work-up of the reaction product begins with addition of 500 ml water. The separated aqueous phase is then extracted with methylene chloride (2.times.250 ml). The combined organic phases are then dried over magnesium sulfate and stripped. The resulting oil is triturated with ether to separate a small amount of insoluble material. Stripping off ether yields 37 grams of product.

Thirty-seven grams of ketone and 240 ml of 96% formic acid are placed into a 1 liter round bottom flask connected to an addition funnel. These components are stirred using a magnetic stir bar. 125 Ml of formic acid with 43 grams of hydroxylamine-O-sulfonic acid dissolved and suspended in it, are added to the funnel. The addition is carried out over a 20 minute period with stirring. The solution darkens. The addition funnel is replaced with a reflux condenser, and the reaction is refluxed for 15-20 hours with samples taken to follow by TLC.

The mixture is carefully poured into 2 kg of ice. After cooling in the ice, the mixture is slowly brought to pH=12 with the addition of 50% NaOH. Three extractions are carried out using 500 cc units of methylene chloride. These extracts are dried over sodium sulfate. After drying, the solvent is stripped off leaving a black oil of about 45 grams.

This oil is dissolved in a minimum of chloroform and loaded onto a column (750 grams of 230-400 mesh silica gel, already slurried in chloroform). The elution progresses using chloroform with 2 vol. % methanol. The elution fractions are followed by TLC (fractions 7-21 give the same product). The similar fractions are combined and removing the eluting solvent yields about 30 grams of lactam.

25 Grams of this lactam is used in the reduction step. Using a 2 liter 3-neck round bottom flask, nitrogen gas is run into the system and vented up through the reflux condenser and into a bubbler. The system has an addition funnel. 460 Ml of anhydrous ether are added into the flask. Carefully, 18 grams of lithium aluminum hydride are also admitted into the flask. There is some gas evolution. The lactam is dissolved in 230 ml of methylene chloride (also anhydrous). After cooling the flask down in an acetone/dry ice bath, the lactam is added dropwise. The reaction is exothermic so periodically more ice needs to be added as temperature rises. The reduction can be followed by change in TLC data (monitored by iodine and eluted on silica with 98/2 chloroform/methanol). The reaction is allowed to come to room temperature overnight.

18 Grams of water are slowly added with the expected exothermic evolution of gas occurring. The ether is removed and its volume replaced with dichloromethane. 18 Grams of 15% NaOH solution and then 55 grams of water are added. The solids which form are filtered off, washed with additional dichloromethane, and combined with the organic fractions and dry over sodium sulfate. The solvent is stripped off to recover about 15 grams of oil/solid mix. This is the crude amine.

10 grams of this amine is quaternized as follows: In a 250 ml flask equipped with stir bar and reflux condenser add the amine, 10 grams of KHCO3, 65 ml of methanol and lastly, 30 grams of ethyl iodide. The mixture is brought to reflux and maintained in that state for 48 hours. Upon cooling, the solvent is removed. The solids are treated with chloroform. In turn the chloroform-soluble fractions are stripped to yield another solid which is recrystallized from a minimum of hot acetone and methanol. Recrystallization in the cold yields 3 separate crops of product, totaling 11 grams of the salt. The melting points for these crops are all in the range of 252-256° C.

The salt is converted to the hydroxide form by ion-exchange over a BioRad AG1-X8 resin.

Example 2

Synthesis of N-Ethyl-N-(3,3,5-trimethylcyclohexyl) pyrrolidinium Cation

Synthesis of N-(3,3,5-trimethylyyclohexyl) pyrrolidine

The structure-directing agent (SDA) is synthesized using the reaction sequence described in the scheme below.

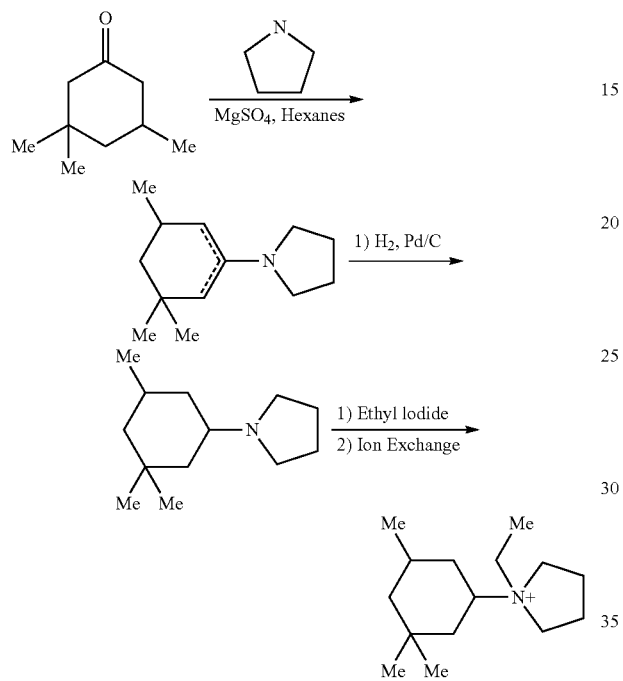

Synthesis of the Parent Amine N-(3,3,5-trimethylcyclohexyl)pyrrolidine

In a 3-liter three neck flask a 150 gm (2.13 mole) of pyrrolidine, 100 gm of 3,5,5-trimethylcyclohexanone (0.71 mole) are mixed in a 1500 ml anhydrous hexane. To the resulting solution, 150 gm (1.25 mole) of anhydrous magnesium sulfate is added and the mixture is mechanically stirred and heated at reflux (the reaction is monitored by NMR analysis) for 132 hours. The reaction mixture is filtered through a fritted glass funnel. The filtrate is concentrated under reduced pressure on a rotary evaporator to give 133 gm of an isomeric mixture of the desired enamine as indicated by $H^1$—NMR and $C^{13}$—NMR analysis [(3,3,5-trimethylcyclohex-enyl)pyrrolidine and (3,3,5-trimethylcyclohex-enyl)pyrrolidine]. Saturation of the enamine mixture, to give N-(3,5,5-trimethylcyclohexyl)pyrrolidine, is accomplished in quantitative yield by hydrogenation in ethanol at a 55 psi pressure of hydrogen gas in the presence of 10% Pd on activated carbon.

Quaternization of N-(3,3,5-trimethylcyclohexyl)pyrrolidine

Synthesis of N-ethyl-N-(3,3,5-trimethcyclohexyl)pyrrolidinium iodide

To a solution of 131 gm (0.67 mole) of N-(3,3,5-trimethylcyclohexyl)pyrrolidine in 1000 ml anhydrous methanol, 210 gm (1.34 mole) of ethyl iodide is added. The reaction is mechanically stirred for 3 days at room temperature. Then, an additional equivalent of ethyl iodide and one equivalent (67.7 gm; 0.0.67 mole) of potassium bicarbonate are added and the reaction is stirred at refluxing temperature for 72 hours. The reaction mixture is concentrated under reduced pressure on a rotary evaporator to give an off-white-colored solid material. The solids are rinsed several times with chloroform and filtered after each rinse. All the chloroform rinses are combined and concentrated to give a white powder whose NMR data are acceptable for the desired quaternary ammonium iodide salt. The reaction affords 218 gm (93% yield) of the product. The iodide salt is purified by re-crystallization in acetone and ether. This is done by completely dissolving the iodide salt in acetone and, then, the precipitation of the product is facilitated by addition of ethyl ether to the acetone solution. Re-crystallization gives 211 gm of the product as white powder (pure by $H^1$ and $C^{13}$—NMR NMR analysis).

Ion Exchange (Synthesis of N-ethyl-N-(3,3,5-trimethylcyclohexyl)pyrrolidinium hydroxide)

To a solution of N-ethyl-N-(3,3,5-trimethylcyclohexyl)pyrrolidinium iodide salt (100 gm; 0.285 mole) in 350 ml water in a 1-liter plastic bottle, 340 gm of Ion-Exchange Resin-OH (BIO RAD® AH1-X8) is added and the mixture is gently stirred at room temperature overnight. The mixture is filtered and the solids rinsed with additional 75 ml of water. Titration analysis with 0.1N HCl gives a total yield of 0.215 mole of hydroxide ions (0.215 mole N-ethyl-N-(3,3,5-trimethylcyclohexyl)pyrrolidinium hydroxide).

Example 3

Synthesis of N-ethyl-N-(2,4,4-trimethylcyclopentyl) pyrrolidinium Cation

N-ethyl-N-(2,4,4,-trimethylcyclopentyl)pyrrolidinium cation is synthesized using the synthetic scheme described above starting from pyrrolidine and 2,4,4-trimethylcyclopentanone.

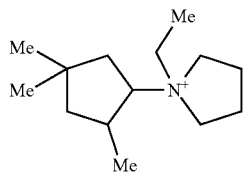 [SMILES: CC[N+]1(C2CC(C)(C)CC2C)CCCC1]

Example 4

Synthesis of SSZ-52x 3.71 grams of an SDA having structure (1), an N,N-diethyl-5,8-dimethyl-2-azonium bicyclo [3.2.2] nonane cation, is mixed with 20.51 grams of water, 9.98 grams of 1N NaOH, 17.28 grams of a sodium silicate solution, 0.18 grams of seed SSZ-52 crystals, and 1.75 grams of sodium Y zeolite as a source of aluminum. The concentration of SDA was 0.54M. All of the components were combined in a 125 cc PTFE liner. The liner was sealed in an autoclave and heated to 135° C. The autoclave was rotated for four days.

A crystalline product was recovered and determined by X-ray diffraction to be SSZ-52x. The product had the XRD data of Table IV and the X-ray diffraction pattern of FIG. 4(a).

Example 5

Synthesis of SSZ-52x

In a 23 mL PTFE autoclave liner, 1.39 mmol of N, N-diethyl-5,8-dimethyl-2-azonium bicyclo [3.2.2] nonane hydroxide (0.54 M), 1.35 g of 1N NaOH solution, 2.59 g of sodium silicate solution, 2.49 g of deionized water, 0.26 g of zeolite Y (CBV300, Zeolyst international, SiO2/Al2O3 mole ratio=5.1), and 0.027 g of SSZ-52 seeds were combined and stirred until a homogenous mixture was obtained. The liner was capped and placed within a Parr steel autoclave reactor. The autoclave heated at 135° C. with rotation (43 rpm) for 4 days. The recovered product was confirmed by XRD to be SSZ-52x.

Example 6

Calcination of SSZ-52x

The material from Example 4 is calcined in the following manner. A thin bed of material is heated in a muffle furnace from room temperature to 120° C. at a rate of 1° C. per minute and held at 120° C. for three hours. The temperature is then ramped up to 540° C. at the same rate and held at this temperature for 5 hours. A 50/50 mixture of air and nitrogen is passed over the zeolite at a rate of 20 standard cubic feet per minute during heating. The X-ray diffraction data for the product was that of Table III.

Example 7

NO$_x$ Conversion

Calcined SSZ-52x was loaded with copper by weight via an incipient wetness process. The ion-exchanged material was then activated by increasing the temperature of the material from room temperature to 150° C. at a rate of 2° C./minute, holding the material at 150° C. for 16 hours, then increasing the temperature of the material to 450° C. at a rate of 5° C./minute, holding the material at 450° C. for 16 hours. The material was then allowed to cool to room temperature again.

The sample was tested to determine its capacity for NO$_x$ conversion (e.g., into Na and 02) as a function of temperature. Fresh (i.e., un-aged) Cu/SSZ-52 was tested using a Synthetic Catalyst Activity Test (SCAT) rig under the following conditions: 500 ppm NO, 500 ppm NH$_3$, 10% 02, 10% H$_2$O and the balance Na, and a space velocity of 60,000/hour. The results are shown in FIG. 2. Aged catalyst, e.g., aged at 750° C. for 80 hours in 10% (humidity), was also tested using SCAT as noted above. The results are shown in FIG. 3 and demonstrate the superior durability and enhanced performance of SSZ-52x compared to SSZ-52.

For the purposes of this specification and appended claims, unless otherwise indicated, all numbers expressing quantities, percentages or proportions, and other numerical values used in the specification and claims, are to be understood as being modified in all instances by the term "about." Furthermore, all ranges disclosed herein are inclusive of the endpoints and are independently combinable. Whenever a numerical range with a lower limit and an upper limit are disclosed, any number falling within the range is also specifically disclosed.

As used herein, the term "comprising" means including elements or steps that are identified following that term, but any such elements or steps are not exhaustive, and an embodiment can include other elements or steps.

Unless otherwise specified, the recitation of a genus of elements, materials or other components, from which an individual component or mixture of components can be selected, is intended to include all possible sub-generic combinations of the listed components and mixtures thereof.

Any term, abbreviation or shorthand not defined is understood to have the ordinary meaning used by a skilled artisan at the time the application is filed. The singular forms "a," "an," and "the," include plural references unless expressly and unequivocally limited to one instance.

All of the publications, patents and patent applications cited in this application are herein incorporated by reference in their entirety to the same extent as if the disclosure of each individual publication, patent application or patent was specifically and individually indicated to be incorporated by reference in its entirety.

What is claimed is:

1. An aluminosilicate molecular sieve composition comprising at least one intergrowth phase comprising a SFW framework type molecular sieve and an AFX framework type molecular sieve, wherein a ratio of the SFW framework type molecular sieve to the AFX framework type molecular sieve in the at least one intergrowth phase is in a range of from 60:40 to 70:30, as determined by powder X-ray diffraction.

2. The molecular sieve according to claim 1, wherein the oxides comprise silicon oxide and aluminum oxide.

3. The molecular sieve composition of claim 2, having a SiO$_2$/Al$_2$O$_3$ molar ratio in a range of from 6 to 50.

4. The molecular sieve according to claim 1, wherein said zeolite is predominantly in the hydrogen form.

5. A zeolite according to claim 4, wherein W is aluminum and Y is silicon.

6. The molecular sieve according to claim 1 having a composition; as synthesized and in the anhydrous state; in terms of mole ratios as follows:

| | |
|---|---|
| YO$_2$/W$_2$O$_3$ | 6-50 |
| M$_{2/n}$/YO$_2$ | 0.1-0.5 |
| Q/YO$_2$ | 0.01-0.08 | wherein Y is silicon; W is aluminum; M is an alkali metal cation, alkaline earth metal cation or mixtures thereof; n is the valence of M; and Q is a quaternary ammonium cation having the structure

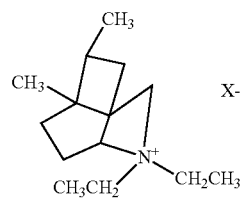

where X— is an anion which is not detrimental to the formation of the zeolite.

7. The molecular sieve of claim 6, wherein Q comprises one or more of N-ethyl-N-(2,4,4-trimethylcyclopentyl)pyrrolidinium cations, and N-ethyl-N-(3,3,5-trimethylcyclohexyl)pyrrolidinium cations.

8. A process for converting a feedstock comprising an organic compound to a conversion product which comprises contacting the feedstock at organic compound conversion conditions with a catalyst comprising an active form of the molecular sieve composition of claim 1.

9. A method for treating an exhaust gas, the method comprising:
(a) contacting an exhaust gas stream comprising NO, and a reducing agent with a supported metal catalyst comprising: (1) one or more transition metals selected from the group consisting of Cr, Mn, Fe, Co, Ce, Ni, Cu, Zn, Ga, Mo, Ru, Rh, Pd, Ag, In, Sn, Re, Ir, Pt, and mixtures thereof, and (2) a support comprising the molecular sieve composition of claim 1, wherein the transition metal is present in an amount of 0.01 to about 6 wt. %, based on the total weight of the molecular sieve material; and
(b) selectively reducing at least a portion of the NO, with the reducing agent to produce $N_2$ and $H_2O$.

10. The method of claim 9, wherein the exhaust gas stream is generated by a lean-burn engine.

11. The method of claim 9, wherein the reducing agent is ammonia.

12. The method of claim 9, wherein the reducing agent is a hydrocarbon.

13. The method of claim 9, wherein the contacting occurs at a temperature of 150° C. to 750° C.

14. The method of claim 9, wherein the contacting occurs at a temperature of at least 900° C.

* * * * *